(No Model.)

G. B. ROOT.
FEEDER FOR GRINDING ROLLS.

No. 287,724. Patented Oct. 30, 1883.

WITNESSES:
Chas. Nida
B. G. Underwood

INVENTOR:
G. B. Root
BY Munn & Co
ATTORNEYS.

UNITED STATES PATENT OFFICE.

GARDNER B. ROOT, OF AMHERST, WISCONSIN.

FEEDER FOR GRINDING-ROLLS.

SPECIFICATION forming part of Letters Patent No. 287,724, dated October 30, 1883.

Application filed August 6, 1883. (No model.)

*To all whom it may concern:*

Be it known that I, GARDNER B. ROOT, of Amherst, in the county of Portage and State of Wisconsin, have invented a new and useful Improvement in Feeders for Grinding-Rolls, of which the following is a full, clear, and exact description.

Reference is to be had to the accompanying drawings, forming a part of this specification, in which similar letters of reference indicate corresponding parts in all the figures.

Figure 1:
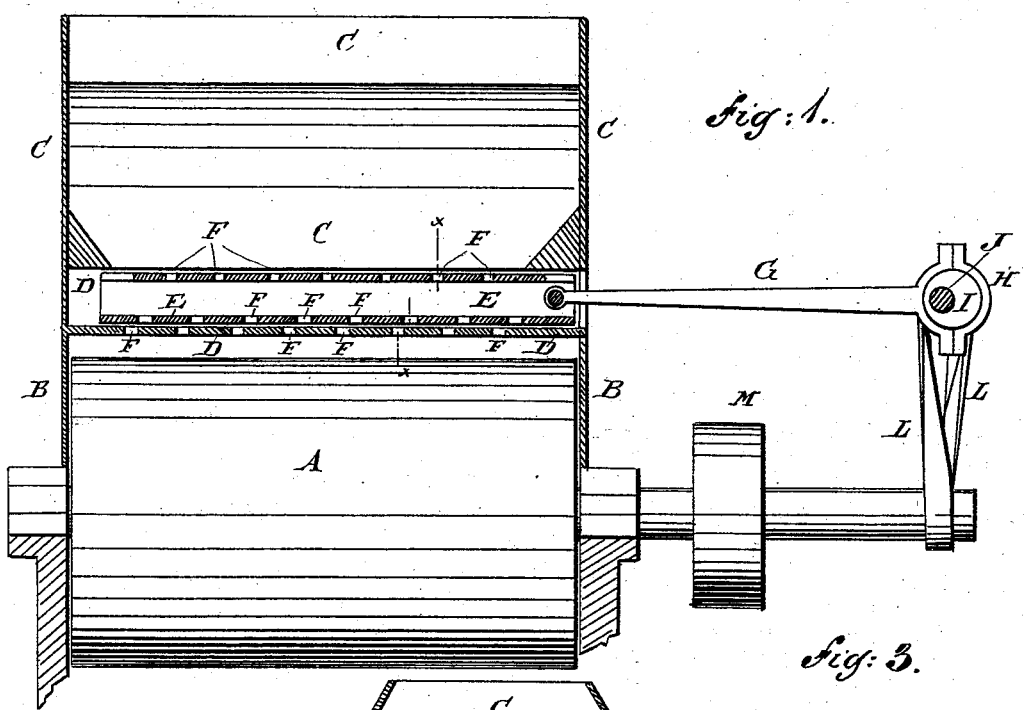
Figures 2, 3:
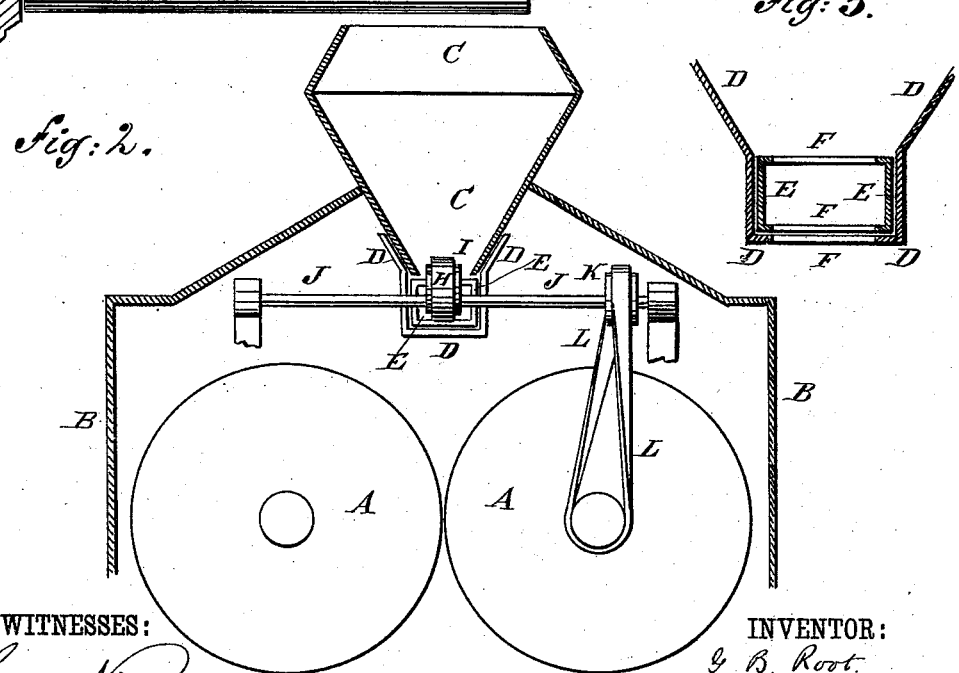

Figure 1 is a sectional side elevation of my improvement, shown as applied to a roller-mill. Fig. 2 is an end elevation of the same, the rolls being shown in end view and the casing and hopper in section. Fig. 3 is a sectional end elevation of the feeder enlarged, taken through the broken line *x x*, Fig. 1.

The object of this invention is to secure an even feed of material to grinding-rolls throughout the entire length of the said rolls.

The invention consists in a feeder for grinding-rolls, constructed with a shell attached to the hopper, and having cross-slots in its bottom, an interior shaker having cross-slots in its bottom and top and connected with one of the rolls by a connecting-rod, an eccentric, and counter-shaft, and a pulley and belt, so that the feeder will distribute the material to be ground evenly to the rolls, and will be driven from the said rolls, as will be fully described and claimed hereinafter.

A represents the rolls, B the casing, and C the hopper, of any ordinary roller-mill.

D is the outer part or shell of the feeder, which extends the entire length of the rolls A, or nearly so, and the sides of which overlap and are secured to the lower part of the hopper, as indicated in Fig. 2. Within the shell D is placed the shoe or shaker E, which is rectangular in cross-section and of such a size as to fit into and move freely in the interior of the shell D. In the top and bottom of the shaker E and in the bottom of the shell D are formed cross-slots F, through which the material to be ground is made to pass by the longitudinal reciprocation of the said shaker E, so that the said material will be distributed evenly along the entire length of the rolls A. The shaker E is made as much shorter than the shell D as will allow the said shaker to have the required length of stroke.

To one end of the shaker E is pivoted the end of a short connecting-rod, G, the other end of which is connected by an eccentric-strap, H, or other suitable means, with an eccentric, I, attached to a short counter-shaft, J, placed at right angles with the rolls A and revolving in bearings attached to the casing B, or other suitable support.

To the counter-shaft J is attached a small pulley, K, around which passes a belt, L. The belt L makes a quarter-twist and passes around the journal of one of the rolls A, or a small pulley attached to the said journal, so that the feeder will be driven from the said rolls.

The journals of the rolls A are designed to be connected by gear-wheels or belt in the ordinary manner, and are driven by a belt passing around a pulley, M, attached to one of the said journals.

With this construction the material to be ground will be fed evenly to the rolls, so that the said rolls will run true and without heating their journals, and will thus produce a better quality of flour than when the ordinary feed is used.

I am aware that it is not new in seeders or hominy-mills to use a perforated slide under a stationary bottom or board suitably apertured to contain the quantity to be fed; but

What I claim as new is—

The combination, with a pair of horizontal grinding-rolls and a casing, B, of the bottomless hopper C, having its outlet over the space between the rolls, a shaker, E, perforated at top and bottom, a bottom perforated shell, D, attached rigidly under the hopper, and suitable mechanism for reciprocating said shaker, as and for the purpose specified.

GARDNER B. ROOT.

Witnesses:
A. J. SMITH,
JACOB O. FOXEN.